United States Patent
Naveh et al.

(10) Patent No.: US 10,537,801 B2
(45) Date of Patent: Jan. 21, 2020

(54) SYSTEM AND METHOD FOR DECISION MAKING IN STRATEGIC ENVIRONMENTS

(71) Applicant: International Business Machines Corporation, Armonk, NY (US)

(72) Inventors: Yehuda Naveh, Haifa (IL); Amir Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 14/171,786

(22) Filed: Feb. 4, 2014

(65) Prior Publication Data

US 2015/0018060 A1   Jan. 15, 2015

Related U.S. Application Data

(60) Provisional application No. 61/844,888, filed on Jul. 11, 2013.

(51) Int. Cl.
  *A63F 13/46*   (2014.01)
  *G06N 5/00*   (2006.01)
  *G06N 5/02*   (2006.01)

(52) U.S. Cl.
  CPC ............ *A63F 13/46* (2014.09); *G06N 5/003* (2013.01); *G06N 5/022* (2013.01)

(58) Field of Classification Search
  CPC ............. G06N 5/03; G06N 5/02; G06N 5/022
  See application file for complete search history.

(56) References Cited

U.S. PATENT DOCUMENTS

| 8,209,250 B2 | 6/2012 | Bradway et al. |
| 2001/0013026 A1* | 8/2001 | Shaffer ............. G01N 33/0034 706/12 |

(Continued)

FOREIGN PATENT DOCUMENTS

WO   2008/088387   7/2008

OTHER PUBLICATIONS

Schvartzman, Julian and Michael P. Wellman "Stronger CDA Strategies through Empirical Game—Theoretic Analysis and Reinforcement Learning" proc of $8^{th}$ In. Conf . on Autonomous Agnet and Multi Agenet systems AAMAS 2009 [Online] Downloaded Jun. 14, 2016 http://dl.acm.org/citation.cfm?id=1558047.*

(Continued)

*Primary Examiner* — Ben M Rifkin
(74) *Attorney, Agent, or Firm* — Ziv Glazberg (57) ABSTRACT

In one embodiment, payoffs to an actor during the strategic game according to a solution concept is simulated a predetermined number of times. A machine learning tool is used to predict a payoff based on the predetermined number of payoffs according to the solution concept, wherein the machine learning tool is trained with plurality of pairs, each pair comprising a set of simulated payoffs and an actual payoff, wherein the simulated payoffs are predetermined number of payoffs determined in accordance with the solution concept. In another embodiment, a process tree representative of a strategic game involving actors is obtained. The process tree may comprise computational nodes, and leaf nodes which define payoff based on computations of the computational nodes. The process tree is reduced to a game tree representing the strategic game by simulating routes in the process tree.

14 Claims, 5 Drawing Sheets

(56) References Cited

U.S. PATENT DOCUMENTS

| | | | |
|---|---|---|---|
| 2006/0167784 A1* | 7/2006 | Hoffberg | G06Q 20/401 705/37 |
| 2010/0145715 A1 | 6/2010 | Cohen | |
| 2011/0301926 A1 | 12/2011 | Chussil | |

OTHER PUBLICATIONS

Wilson, Edward. "Game Theory: Basic Concepts" 1998 [ONLINE] Downloaded Jun. 14, 2016 http://www.umass.edu/preferen/Game%20Theory%20Evolving/GTE%20Public/GTE%20Game%20Theory%20Basic%20Concepts.pdf.*

Wright, James and Kevin Leyton-BRown "Byond Equilibrium: Predicting Human Behavior in Normal-Form Games" 2010 Association for the Advancemtn fo Artificail Intelligence. [ONLINE] Downlaoded Jun. 14, 2016 https://cs.uwaterloo.ca/~klarson/teaching/epfl/papers/Wright10-Beyond.pdf.*

McKelvey et al., "Quantal Response Equilibria for Extensive Form Games", Experimental Economics 1: 9-41, 1998.

Colin F. Camerer, "Behavioral game theory: Predicting human behavior in strategic situations", Advances in behavioral economics, New York Princeton University Press 2004 , pp. 374-392.

John F. Nash, "Equilibrium points in n-person games", Proceedings of the National Academy of Sciences of the United States of America, vol. 36(1), pp. 48-49, Nov. 1949.

McKelvey et al., "Gambit: Software Tools for Game Theory", Version Sep. 1, 2010. Full documentation can be found at : http://www.gambit-project.org/gambit13/index.html.

Mitchell Osak, "Using Game Theory to Improve Strategic Decision Making", Financial Post online, Jul. 2010. Can be found at : http://business.financialpost.com/2010/07/24/using-game-theory-to-improve-strategic-decision-making/.

Anthony Kelly, "Decision Making using Game Theory", Cambridge University Press, 2003.

* cited by examiner

SYSTEM AND METHOD FOR DECISION MAKING IN STRATEGIC ENVIRONMENTS

CROSS-REFERENCE TO RELATED APPLICATION

This application claims the benefit of U.S. Provisional Application No. 61/844,888 filed Jul. 11, 2013, entitled "SYSTEM AND METHOD FOR ROBUST DECISION MAKING IN STRATEGIC ENVIRONMENTS", which is hereby incorporated by reference in its entirety.

TECHNICAL FIELD

The present disclosure relates to strategic environments in general, and to systems and method for supporting decision making, in particular.

BACKGROUND

An operative environment is called strategic if it involves self interested agents who act on the basis of their own self interest (e.g. humans, organizations, companies) and their decisions affect each other. Decisions on how to act in strategic environments are taken by numerous organizations and individuals on a regular basis. Such decisions are referred to as "strategic decisions".

When making strategic decisions, a decision maker needs to carefully consider not only his own action but the action of other decision makers that will act in response to the decision maker. Such situations arise in domains such as economic competition between companies where each company is after its own revenue, political situations, workforce management, and many more.

Game theory is a mathematical discipline that aims at shedding light on strategic decision making. Yet there is a large gap between modeling and analyzing real life situations and the tools that the theory currently provides.

Strategic games, or simply games, in game theory may be modeled using normal-form. A game in normal-form is a structure $G=\langle P, S, F \rangle$, where $P=1, 2, \ldots, m$) is a set of actors, $S=(S_1, S_2, \ldots, S_m)$ is an m-tuple of pure strategy sets, one for each actor, where each strategy set comprises a finite number of strategies that the actor may take, and where $F=(F_1, F_2, \ldots, F_m)$ is an m-tuple of payoff functions, where each payoff function $F_i: S_1 \times S_2 \times \ldots \times S_m$ is associated with an actor and defines the payoff of the actor based on the strategies taken by each actor.

Games in game theory may be modeled using game trees. Inner nodes of the trees represent strategic decisions by an actor, where all sibling nodes are associated with the same actor (i.e., strategic entity), and utilities (e.g., payoffs) are indicated in the leaf nodes. In a common game tree, each hierarchical level in the tree is associated with a different actor.

BRIEF SUMMARY

One exemplary embodiment of the disclosed subject matter is a computerized apparatus having a processor, the processor being adapted to perform the steps of: obtaining a description of a strategic game, wherein an actor makes a strategic decision in the strategic game; simulating a predetermined number of payoffs to the actor during the strategic game, wherein said simulating is performed based on a solution concept; and utilizing a machine learning prediction tool to predict a payoff to the actor based on the predetermined number of payoffs, wherein the machine learning predicting tool is trained with plurality of pairs, each pair comprising a set of simulated payoffs and an actual payoff, wherein the simulated payoffs are predetermined number of payoffs determined in accordance with the solution concept.

Another exemplary embodiment of the disclosed subject matter is a computerized apparatus having a processor, the processor being adapted to perform the steps of: obtaining a process tree representative of a strategic game involving actors, wherein the process tree comprises computational nodes, strategic decision nodes and leaf nodes, wherein the strategic decision nodes are associated with a strategic decision of actors, wherein the computational nodes define a computation value for a variable, wherein the leaf nodes define payoffs for the actors, wherein at least for one leaf node the payoff is defined based on the computational value of the variable; and simulating routes defined in the process tree to reduce the process tree into a game tree representing the strategic game.

Yet another exemplary embodiment of the disclosed subject matter is a computer program product comprising a non-transitory computer readable medium retaining program instructions, which instructions when read by a processor, cause the processor to perform a method comprising: obtaining a description of a strategic game, wherein an actor makes a strategic decision in the strategic game; simulating a predetermined number of payoffs to the actor during the strategic game, wherein said simulating is performed based on a solution concept; and utilizing a machine learning prediction tool to predict a payoff to the actor based on the predetermined number of payoffs, wherein the machine learning predicting tool is trained with plurality of pairs, each pair comprising a set of simulated payoffs and an actual payoff, wherein the simulated payoffs are predetermined number of payoffs determined in accordance with the solution concept.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with the disclosed subject matter is to provide predictions of results of strategic scenarios. Given a strategic game, be it in a formal or non-formal manner, a prediction of the result of the strategic game may be desirable. The prediction may be with respect to a query provided by a user, such as providing assumptions on actions of actors within the game, addressing expected utility or the like.

Another technical problem dealt with the disclosed subject matter is to provide for a modeling system which would allow a user to define a strategic game without the user having to estimate payoffs for each scenario on his own. In some exemplary embodiments, the modeling system may be designed so as to allow the user to define games which involve some level of non-determinism, such as being based on stochastic models.

One technical solution provided by the disclosed subject matter is to generate a feature of a strategic game by simulating payoffs in accordance with one or more solution concepts. The feature may include a constant number, referred to as N, payoffs. N may be indifferent to the specific game, its definition or other features. The feature may be of a predetermined structure which is not affected by the definition of the game, the number of actors, the number of potential actions, the number of equilibriums, or the like.

In some exemplary embodiments, the feature that is extracted from the game may be provided to a machine learning tool that is configured to provide a prediction.

The machine learning tool may be trained with pairs (F,R) provided from past games, wherein F may be a feature of the past game and R may be a result that was received when the game was played. It will be noted that F may be an analytical prediction of a result, such as provided based on various mathematical computations, whereas R may be a result that was received in "real life". In some cases, the mathematical prediction may be correct. However, in some cases, the mathematical prediction may be incorrect, such as due to biasing, actors not being rational, the modeling not taking into account all aspects of the game, or the like.

In some exemplary embodiments, the feature may include predictions based one or more solution concepts. The solution concept may be any algorithm useful for providing a prediction of the result of the game. The solution concept may be a game theoretical algorithm such as quantal response equilibrium, Nash equilibrium, quantal level k (QL-k) equilibrium equilibrium, or the like. In some exemplary embodiments, solution concepts may differ in parameterization (e.g., sophistication level). Optionally, and to accommodate stochastic nature of games, a solution concept may be used to provide a plurality of predictions of outcomes that would adhere to a distribution of the result according to the solution concept (e.g., in case the four results R1, R2, R3 and R4 are distributed as 10% R1, 40% R2, 20% R3 and 30% R4, the plurality of predictions may be distributed in a similar manner). In one embodiment, each solution concept is used to provide a predetermined number of features, such as ten features. Optionally, the game is simulated over a plurality of time (e.g., which may be larger than the predetermined number of features; e.g., 100), the results are sorted and percentiles are used as the features (e.g., in case of ten features, the 10%, 20%, . . . 100% percentiles may be used as the features). In some exemplary embodiments, a plurality of solution concepts may be used. As an example, three solution concepts may be used, each of which can be used to determine ten features, and in total for each game the feature extraction module defines 30 features.

In some exemplary embodiments, the set of N values may be normalized. In some exemplary embodiments, the N values may be sorted. Additionally or alternatively, the N values may be provided in as separate sets of sorted values, such as for each solution concept, the values may be sorted.

Another technical solution provided by the disclosed subject matter is to model the game using a process tree. The process tree may be a Directed Acyclic Graph (DAG) or a tree. The process tree may comprise nodes connected by edges. The nodes may include computational nodes which may define how to compute a value for a variable. The nodes may include strategic decision nodes which correspond to decisions that are being made by an actor. The leaf nodes may define the payoff value. In some embodiments, the payoff value may be defined based on the variable and while performing some computations. The modeling of a strategic game using a process tree may also a user to avoid computing potential payoffs but rather provide an algorithm to define how such payoffs are computed. In some cases, the payoffs may be non-deterministic. In such cases, the user may avoid computing an expected value based on such algorithm but rather provide the non-deterministic algorithm. The non-deterministic algorithm may be computed when the game is simulated. In some exemplary embodiments, the non-deterministic algorithm may be, for example, based on a stochastic model.

In some exemplary embodiments, nodes of the process tree may define performance of any of the following actions: (1) making a strategic action; (2) setting environment variables, either deterministically or stochastically, and optionally via a computation (e.g., cost of product quality levels). In some exemplary embodiments, the value of the environment variables may be obtained from the parent node of the node and may be passed to the children nodes of the node. Optionally, a node may set variables and modify the environment that it passes to its children; (3) affecting a signal space of the actors (e.g. let agents know the above cost); (4) computing or setting the payoffs of the actors. Such a computation may use the above variables that were set by predecessor nodes.

In some exemplary embodiments, the process tree may be used to generate many game instance that correspond to a stochastic nature of the situation, as captured by the process tree, and to the fact that there may be unknowns. In some exemplary embodiments, different game instances may be generated so as to provide for a range of utilities to an actor in the strategic game, to be used for sensitivity analysis.

Yet another technical solution is to reduce the process tree into a game tree or other formal description of a strategic game, a computer may perform simulation of each route in the process tree. Based on the leaf of each such route, a payoff of each combination of actions may be determined In some exemplary embodiments, the game tree may be defined based on the computed payoffs and leaving the strategic decision nodes in the process tree unset.

In some exemplary embodiments, in case of the model is non-deterministic (e.g., it includes stochastic determinations), each path in the model may be simulated a plurality of times and an average utility, median utility or another computation over the utilities in the different simulations may be computed and used as the utility in the game tree.

In some exemplary embodiments, the model may be reduced into a different game model (e.g., a matrix-based game). A model may produce ensemble of game trees, for example by changing the agents' utilities or other variables of interest. This can be useful, for example, for sensitivity analysis.

Yet another technical solution may be to provide a user with a query engine over a given strategic game. In some exemplary embodiments, the query may relate to expected utility of an actor, probability of a specific outcome, or the like. In some exemplary embodiments, the query may include assumptions such as assumptions over the strategic decisions taken during the game by actors. Additionally or alternatively, the query may include modification instructions which may modify the game, such as by modifying the payoffs in the game or other computations performed in a process tree representing the game. The query may be answered using a predication by a machine learning tool. In some exemplary embodiments, based on the query, a process tree may be simulated, taking into consideration any assumptions and modifications defined by the query, in order to define a game instance. In some exemplary embodiments, several game instances may be computed and aggregated so as to provide an expected average game in case that non-determinism may be involved. Based on the game instance (or aggregated game instance), a feature may be extracted and provided to a machine learning tool for prediction. The machine learning tool may provide a prediction in view of training data that was used to set its statistical model or otherwise configure the machine learning tool to provide predictions. The prediction provided by the machine learning tool may be displayed to the user.

One technical effect of the disclosed subject matter may be a uniform feature system which is relevant for every potential strategic game, regardless of its structure, content, or any other characterization.

Another technical effect may be providing a relatively robust analysis of game theoretic representations. A statistical models of the machine learning tool may be trained across multiple games in order provide relatively high confidence answers to various queries on games and game ensembles. The training data may be based on games which were observed in the past. The solution concepts may give a theoretical result which may or may not adhere to the actual result when playing the game. In reality, the result may differ such as due to biasing, non-rational behavior, due to other reasons, or the like. The prediction provided by the disclosed subject matter may be based on the results that the solution concepts provide for the game (the features) and based on how similar results have been played out in past games (training data). As a result, the machine learning tool may identify games in which the prediction of the solution concept tend to be incorrect and may provide improved predictions based on actual outcomes, while still providing the predictions of the solution concept, when such predictions are useful.

The disclosed subject matter may be useful in overcoming drawbacks of game theory. One drawback may be that modeling real life scenarios may be a non-trivial task. For example, it may be hard to determine which payoffs should be included for each scenario depicted by the game. Another drawback may be related to making an accurate prediction of the outcome of a game. Using solution concepts, which may be based on economical theories, may not rely on actual outcomes observed in games.

Figure 1:
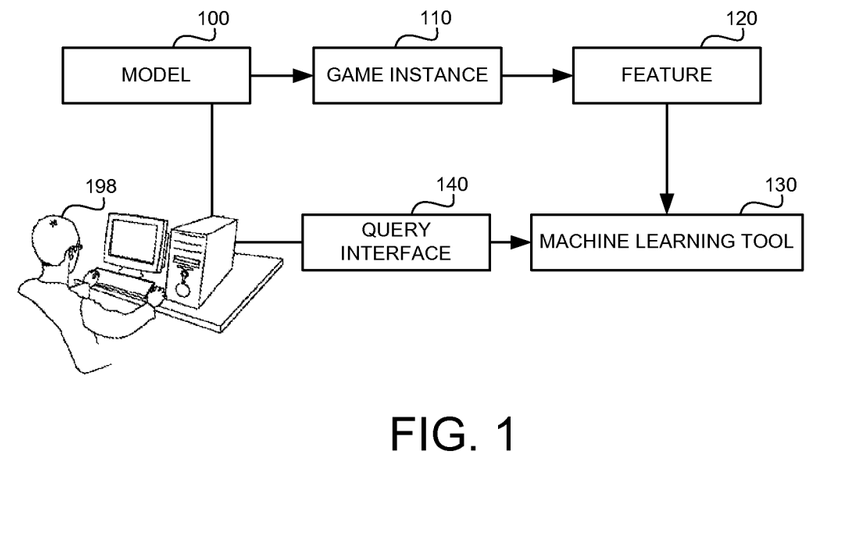
FIG. 1 shows an illustration of a computerized environment, in accordance with some exemplary embodiments of the disclosed subject matter.

Referring now to FIG. 1 showing an illustration of a computerized environment, in accordance with some exemplary embodiments of the disclosed subject matter.

A User 198 may utilize a terminal, a workstation, or the like, to provide input and review output of the computerized system in accordance with the disclosed subject matter.

User 198 may model a Model 100, such as a process tree. Model 100 may define the payoffs for the actors in a strategic game or ensemble of games. Model 100 may utilize computations in order to define at least one payoff. A system in accordance with the disclosed subject matter may transform Model 100 into a Game Instance 110. Model 100 may be simulated in order to reduce Model 100 into Game Instance 110. In some exemplary embodiments, Model 100 may be simulated a plurality of times in order to generate a plurality of game instances which may be aggregated into Game Instance 110.

Based on Game Instance 110, a Feature 120 may be obtained. Feature 120 may be a vector of N payoffs in accordance to one or more solution concepts.

Machine Learning Tool 130 may be a machine, implemented by hardware or software, that implements a machine learning technique such as, for example, Support Vector Machines (SVMs), logistic regression, Gaussian process, or the like. Machine Learning Tool 130 may be utilized to provide a prediction for the feature vector (Feature 120). Machine Learning Tool 130 may be training with respect to a training set, which may include sets of pairs (F,L), wherein F is a feature and L is a label. The feature may be extracted from a game instance, similarly to the extraction of Feature 120 from Game Instance 110. L may be a label indicating an observed payoff when the game was played. As opposed to the theoretical prediction of a solution concept, which are included in F, L indicates actual payoff. It will be noted that if Game Instance 110 is played as well, its results may be provided to Machine Learning Tool 130 to potentially improve its accuracy.

In some exemplary embodiments, Query Interface 140 may provide User 198 with an interface to provide queries on the game depicted by Model 100. In some exemplary embodiments, based on assumptions or modifications provided in the query, a modified game instance may be generated from Model 100 instead of, or in addition to, Game Instance 110.

In some exemplary embodiments, the queries may include the best and worst scenarios, fixing a categorical variable, dependency analysis, query such as whether a utility of an actor is likely to be at least X, or whether the outcome will be A, etc. It will be noted that many other queries, such as what should an actor do, may be reduced to the query that asks whether a utility of an actor is likely to be at least X. Additionally or alternatively, Query Interface 140 may enable a user to provide a query such as E[Ui] (estimated utility of entity i), E[Ui|a]) (estimated utility of entity i given that "a" occurs), or the like.

Figure 2:
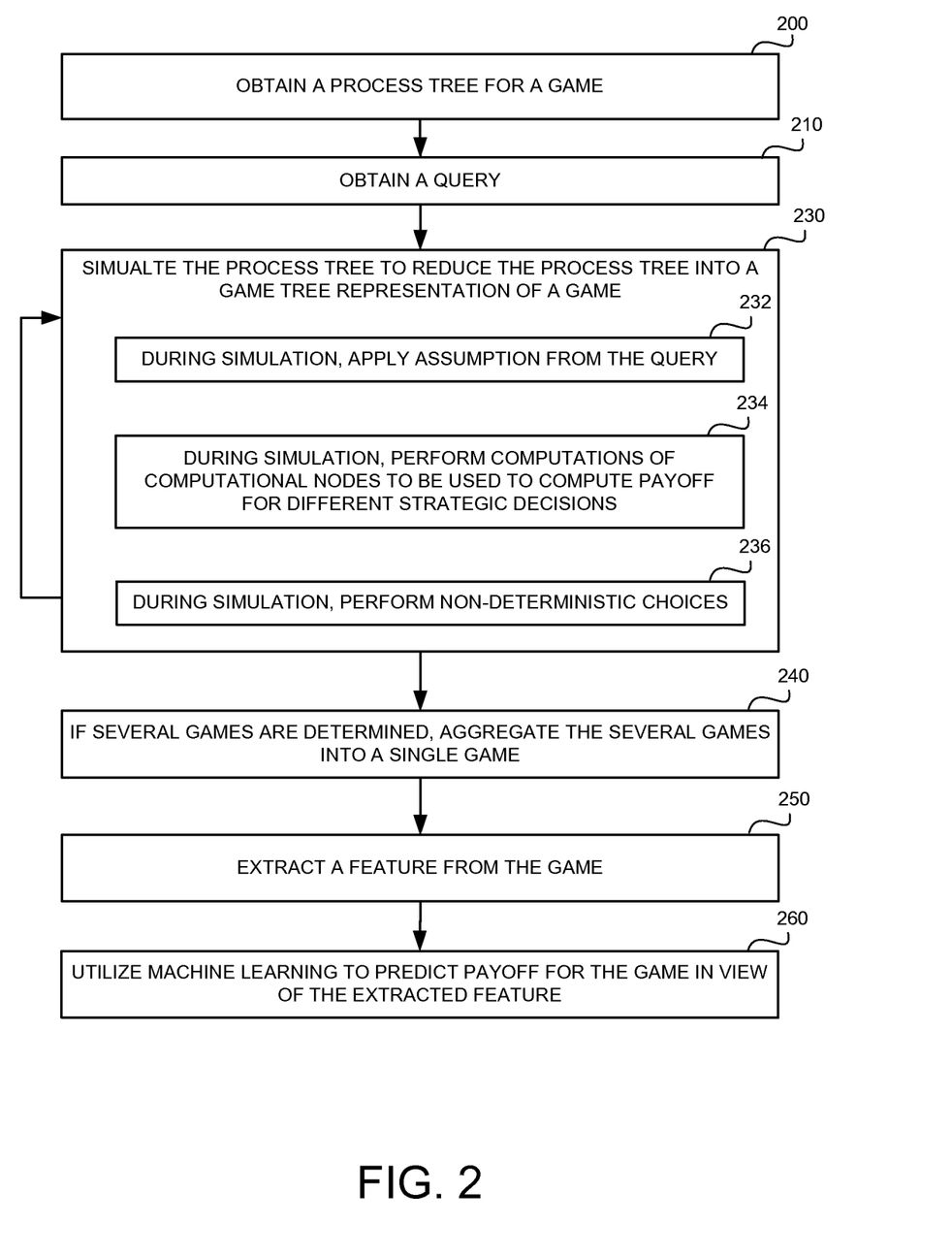
FIG. 2 shows a flowchart diagram of a method, in accordance with some embodiments of the disclosed subject matter.

Referring now to FIG. 2 showing a flowchart diagram of a method, in accordance with some embodiments of the disclosed subject matter.

In Step 200, a process tree depicting a game or ensemble of games may be obtained. The process tree may be obtained from a user. Additionally or alternatively, the process tree may be obtained from a storage unit.

In Step 210, a query is obtained. The query may relate to the predicted payoff in the game. Additionally or alternatively, the query may provide a modification instruction to modify the game. Additionally or alternatively, the query may provide an assumption instruction indicating, for example, a predetermined strategic decision by an actor that may be assumed to be taken.

In Step 230, the process tree may be simulated to reduce the process tree into a game instance. In some exemplary embodiments, the game instance may be provided in a game tree representation. Additionally or alternatively, other game representations may be used. The simulation may include simulating each route from a root node of the process tree to each leaf node. In some exemplary embodiments, during simulation modifications or assumptions defined by the query may be applied (232). In some exemplary embodiments, during simulation, each computation defined by a node of the process tree may be performed (234). The computed value may be used in next nodes of the process tree, such as in order to compute a payoff in a leaf node. In some exemplary embodiments, during simulation, if a non-deterministic choice is encountered, the non-deterministic choice is performed so as to reduce it to a single outcome (236).

Step 230 may be performed a plurality of times, each time simulating the process tree into potentially a different game instance. In some exemplary embodiments, in each simulation non-deterministic choices may be potentially taken and therefore different instances may be created.

In Step 240, in case there are several game instances, they may be aggregated into a single game.

The game that is provided after step 230 or after aggregating the games in Step 240 may be a game as is known in the game theory and may be represented using a game tree representation, using normal-form representation, or the like.

Figure 5:
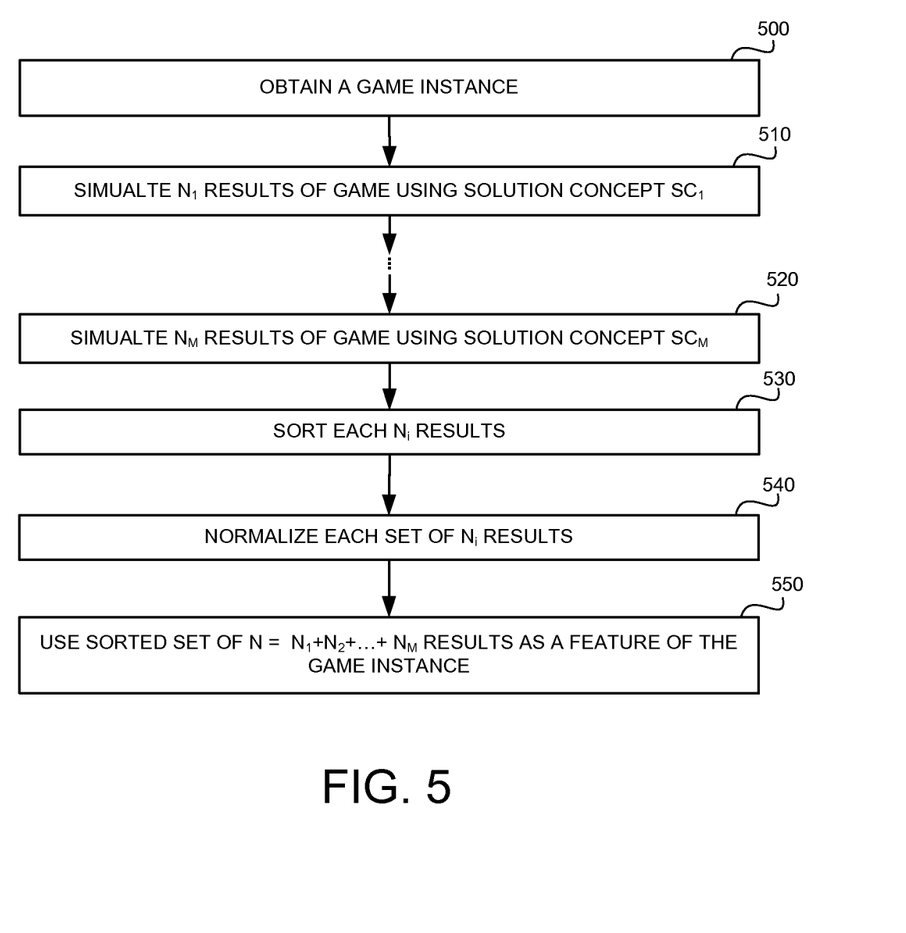
FIG. 5 shows a flowchart diagram of a method, in accordance with some embodiments of the disclosed subject matter.

In Step 250, a game may be extracted from the game. The feature may be extracted using a method such as depicted in FIG. 5. In some exemplary embodiments, the feature may have a constant structure which is indifferent to the definition of the game, including the number of actors, the number of potential actions, or the like.

In Step 260, machine learning techniques may be employed to predict a payoff for the game in view of the extracted feature. In some exemplary embodiments, a machine learning tool may be trained with respect to a plurality of pairs of features and labels, where the features are similar to the feature extracted in Step 250 and the label is the observed payoff when the game was played. The prediction of the machine learning technique may be provided as a result to the user in response to the query of Step 210.

Figure 3A:
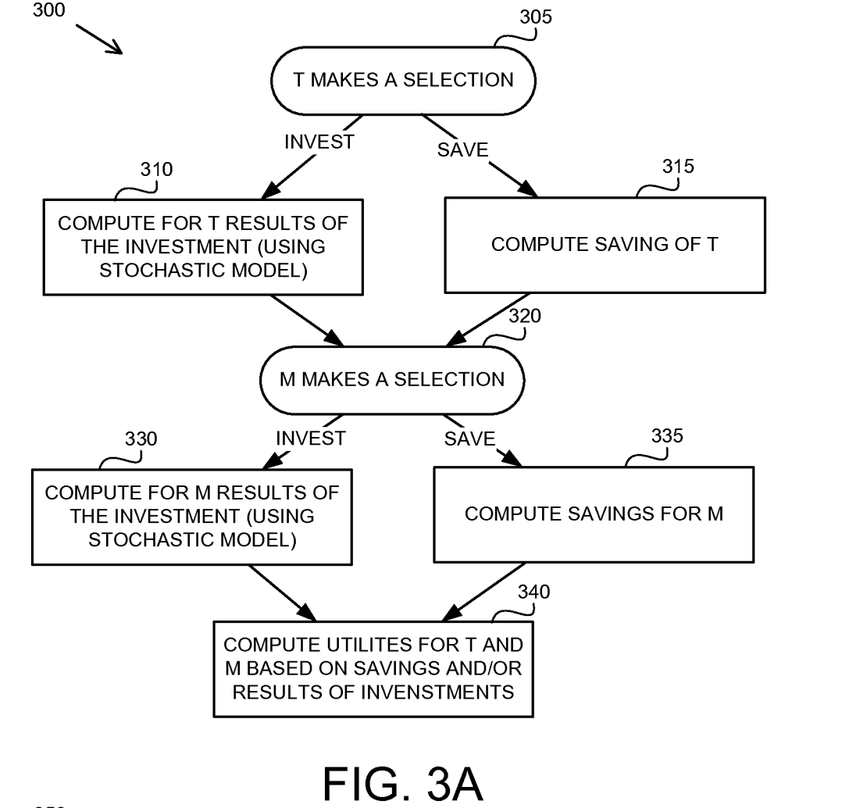
FIG. 3A shows an illustration of a process tree, in accordance with some exemplary embodiments of the disclosed subject matter.

Referring now to FIG. 3A showing an illustration of a process tree, in accordance with some exemplary embodiments of the disclosed subject matter.

Process Tree 300 models a strategic game between two actors, T and M, both can chose to either save or invest. As an example, Process Tree 300 may describe a game between two competitors on a market. Each competitor may decide to invest in improving his product or save the earned money. In some exemplary embodiments, investment in research may yield non-deterministic results. The payoff for each actor may depend upon the results of his research activity, if performed.

Node 305 is a root node. Node 305 may be a strategic decision node which relates to the strategic decision of actor T. In case T decides to invest, the edge to Node 310 is taken. If T decides to save, the edge to Node 315 is taken.

In some exemplary embodiments, Node 310 may be a computational node which defines a computational activity. In Node 310 the results of the investment may be computed, such as based on a stochastic model which simulates the non-deterministic nature of the research activity and its results. In some exemplary embodiments, the results of the research activity may be retained in a variable. The variable may be an environment variable whose value is passed to child nodes, the route that is being processed includes Node 310.

In some exemplary embodiments, Node 315 may be a computation node which computes the savings of T as a result of his savings activity. In some exemplary embodiments, the savings may be predetermined and no computation may be required. Node 315 may assign the predetermined value to a variable, such as an environment variable.

Node 320 may be a strategic decision node which relates to the strategic decision of actor M. In case M decides to invest, the edge to Node 330 is taken. Node 330 may be a computational node similar to Node 310. If the decision is to save, Node 335 is taken. Node 335 may be similar to Node 315. In some exemplary embodiments, Nodes 330, 335 may use different variables than those used in Nodes 310, 315.

Node 340 may be a leaf node defining payoffs for the actors. The payoffs may be computed by computing utilities for T and M based on the savings and/or results of the investments. As an example, based a successful research activity, T's product may be superior to that of M, and T may control a larger portion of the market. The greater the quality differences between the products, the larger the product share. The utilities may be computed by defining a supply provided by M and T, defining demand in the market, and determining a quantity sold in the market, while taking into account the share that each actor has in the market. In some exemplary embodiments, the payoff may be computed based on the value of any variable, such as environment variable, whose value was computed in a computation node.

In some exemplary embodiments, a node may provide signaling information affecting a signal space of other actors. As an example, a node may signal other actors which strategic decision the actor has made. As another example, a node may provide computed information to be readable by nodes associated with other actors.

Figure 3B:
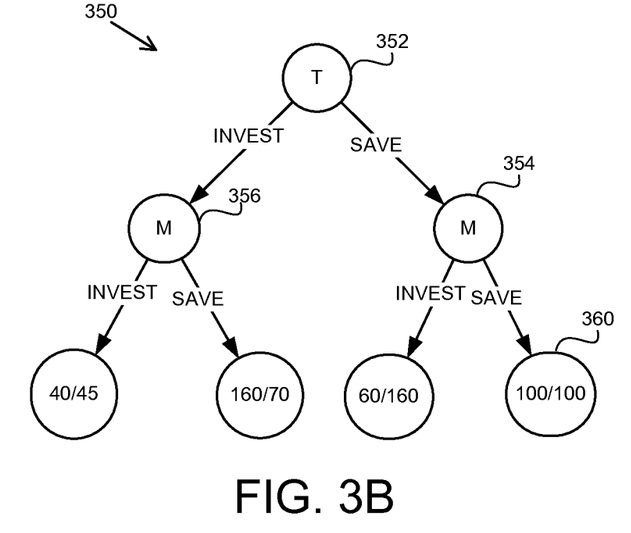
FIG. 3B-3E show game instances, in accordance with some exemplary embodiments of the disclosed subject matter.

FIG. 3B shows an illustration of a game instance based on Process Node 300. Game Tree 350 is a game instance. Nodes of Game Tree 350 include the strategic decision nodes of Process Tree (Nodes 352, 354, 356) and leaf nodes in which the computed payoffs that were computed in Node 340 are indicated (e.g., Node 360).

As can be appreciated, the route in Game Tree 350 that starts with Node 352 and ends in Node 360 corresponds to a route in the process tree which includes Nodes 305, 315, 320, 335, 340.

Game Tree 350 may be computed based on a simulation of Process Tree 305 to obtain the different payoffs. As an example, the payoffs in Node 360 may be computed based on the computations included in Nodes 315, 335 and 340.

Figure 3C:
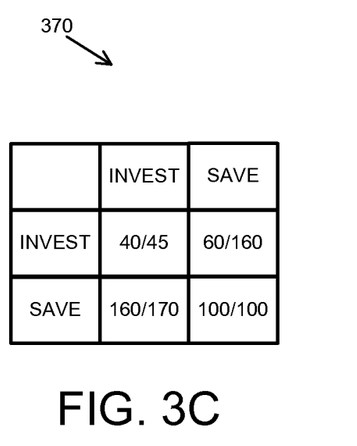

FIG. 3C shows an illustration of a normal-form description of the game instance described by Game Tree 350. Matrix 370 may be a normal-form description of the game instance described by Game Tree 350. As can be appreciated, Process Tree 305 may be reduced to Matrix 370.

Figures 3D, 3E:
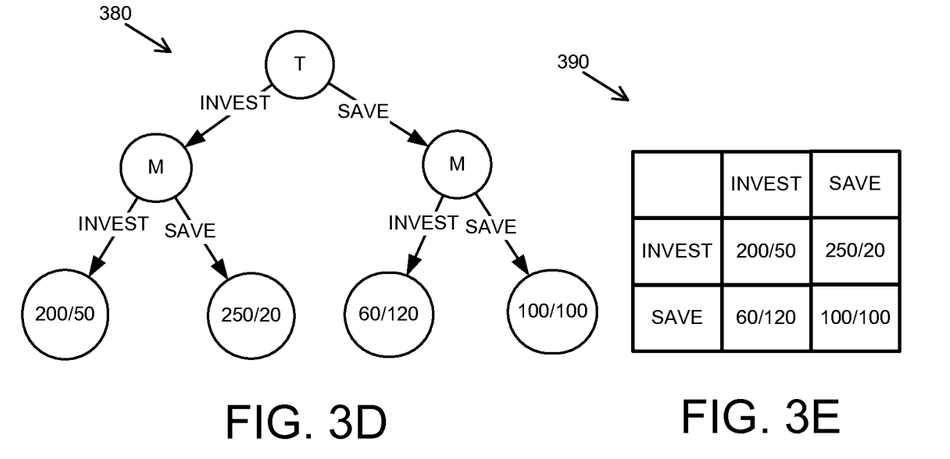

Referring now to FIG. 3D and 3E, which show illustrations of a game tree and normal-form description of another game instance according to Process Tree 305. In some exemplary embodiments, Process Tree 305 may include non-deterministic decisions, such as in computing the return on the investment action. As a result, in different simulations, a different game instance may be determined In some exemplary embodiments, the Game Tree 380, which corresponds to Matrix 390, describe another game instance in accordance with Process Tree 305. In some exemplary embodiments, a plurality of different game instances may be computed based on Process Tree 305 and may be aggregated into an estimated game.

As can be appreciated, in the different game instances there may be a different equilibrium. In the game of Matrix 370, it can be determined that the equilibrium is expected to be (T=SAVE, M=INVEST), as SAVE is a dominating strategy for T (e.g., the payoffs for T=SAVE are higher no matter what action M decides) and as under the assumption of T=SAVE, M gets the highest payoff when performing the INVEST strategy. In the game of Matrix 390, on the other hand. The expected equilibrium may be (T=INVEST, M=INVEST), as for both actors, the INVEST strategy is a dominating strategy.

Figure 4:
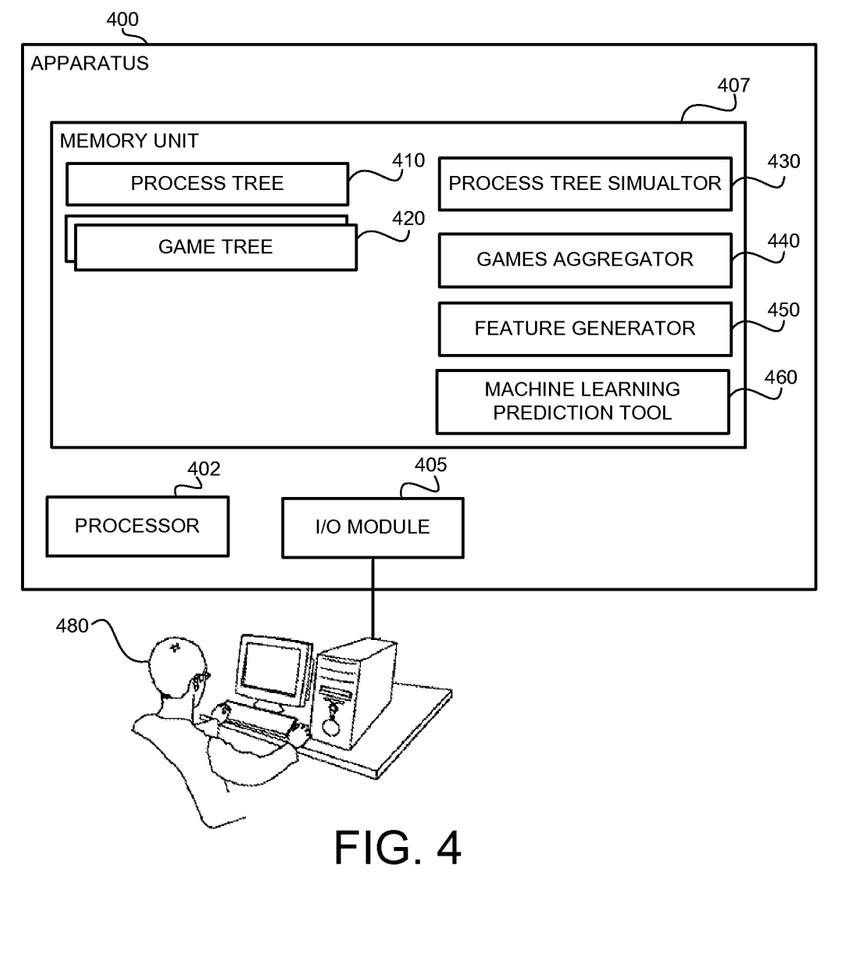
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter. An Apparatus 400 may be a computerized apparatus adapted to perform methods such as depicted in FIG. 1, 2 or 5.

In some exemplary embodiments, Apparatus 400 may comprise a Processor 402. Processor 402 may be a Central Processing Unit (CPU), a microprocessor, an electronic circuit, an Integrated Circuit (IC) or the like. Alternatively, Apparatus 400 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 402 may be utilized to perform computations required by Apparatus 400 or any of it subcomponents.

In some exemplary embodiments of the disclosed subject matter, Apparatus 300 may comprise an Input/Output (I/O) Module 405 such as a terminal, a display, a keyboard, an input device or the like to interact with the system, to invoke the system and to receive results. It will however be appreciated that the system can operate without human operation.

In some exemplary embodiments, the I/O Module 405 may be utilized to provide an interface to a User 480 to interact with Apparatus 400, such as to present the display to User 480, to allow User 480 to provide a process tree, or other model of a game, to allow User 480 to input queries regarding a game or model, to output predictions regarding the model or response to the query, or the like.

In some exemplary embodiments, Apparatus 400 may comprise a Memory Unit 407. Memory Unit 407 may be persistent or volatile. For example, Memory Unit 407 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 407 may retain program code operative to cause Processor 402 to perform acts associated with any of the steps shown in FIGS. 1, 2 and 7.

Process Tree 410 may be retained on Memory Unit 407. Process Tree 410 may be a digital representation of the process tree model used to describe a game in accordance with some embodiments of the disclosed subject matter.

One or more Game Trees 420 may be retained on Memory Unit 407. Game Trees 420 may be determined by reducing Process Tree 410 into a game instance.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

Process Tree Simulator 430 may be configured to simulate the computational processes defined by Process Tree 410 in order to reduce Process Tree 410 into a game instance, such as depicted by a Game Tree 420. In some exemplary embodiments, Process Tree Simulator 430 may be configured to simulate Process Tree 410 by making non-deterministic decisions, by applying modification or assumptions defined in a query, or the like. In some exemplary embodiments, Process Tree Simulator 430 may be configured to compute for each route in the Process Tree 410 a payoff based on a variable value which is computed in a computational node.

Games Aggregator 440 may be configured to aggregate a plurality of game instances, such as Game Trees 420, into a single game. The aggregated game may include an expected payoff in view of the different games.

Feature Generator 450 may be configured to extract a feature from a game instance. The feature may be based on expected payoffs in accordance with one or more solution concepts.

Machine Learning Prediction Tool 460, such as 130 of FIG. 1, may be configured to utilize machine learning techniques to predict a label for the game based on the extracted feature. The label may indicate a predicted payoff. In some exemplary embodiments, Machine Learning Prediction Tool 460 may be trained with respect to a training set that is comprised of game instance whose actual outcomes were observed.

Referring now to FIG. 5 showing a flowchart diagram of a method, in accordance with some embodiments of the disclosed subject matter.

In Step 500, a game instance is obtained. The game instance may be obtained from another source, may be manually provided by a user, may be obtained by reducing a process tree, or the like.

In Step 510, one solution concept, denoted as $SC_1$, is used to simulate results of the game. $SC_1$ may be used to provide $N_1$ results. In some exemplary embodiments, all $N_1$ results may be identical. Additionally or alternatively, there may be potentially different results, such as in case of a mixed equilibrium, as opposed to a pure-strategy equilibrium. In some exemplary embodiments, any number of solution concepts may be used, each of which may be used to provide a predetermined number of results. In some exemplary embodiments, the predetermined number may the same number or a different number for all solution concepts. Step 520 exemplifies a similar step to Step 510 that relates to the m-th solution concept, $SC_m$.

In some exemplary embodiments, more than $N_i$ results may be determined and a subset of $N_i$ may be selected therefrom. As an example, in case there are ten results to be selected, the 10%, 20%, 30%, ..., 100% percentiles may be selected from the results in order to selected the ten results to be used.

In Step 530, each set of results that was determined by a solution concept may be sorted. In some exemplary embodiments, when the results are selected as percentiles they may already be sorted.

In Step 540, each set of results may be normalized. Normalization may be useful to allow using the results of games with different absolute payoffs but with the same proportion for prediction. In some exemplary embodiments, the machine learning method may not require normalization and may infer prediction from payoffs of the same proportion but of different absolute values.

In Step 550, a vector of N values may be used as a feature of the game instance obtained in Step 500. The vector may include N values that include $N_1+N_2+ \ldots +N_m$ values. As an example, there may be 30 values in the vector that include ten values of a first solution concept, ten values of a second solution concept and ten values of a third solution concept.

Robust Predictions

The disclosed subject matter may provide a unified way of producing a relatively high confidence results to queries. The predictions provided by multiple solution concepts on the same game or game ensemble may allow to combine their results into a relatively high confidence predictions. For concretization, suppose that all the solution concepts predict that the outcome of a game will be A and the result holds even when the utilities of the actor are perturbed. In such a case, the confidence in the prediction that the outcome will be A may be relatively high.

For each game, the answer of each solution concept can be viewed as a feature, so each game yields a feature vector in machine learning sense. Since all games may be reduced to a common set of features, machine learning techniques can be used in order to train models to make high confidence predictions across all games (e.g. give more weight to one family of solution concept or one family of perturbations). Such an approach may generate results which may be more accurate than that provided by a single solution concept such as Nash equilibria or a quantal response with a fixed parameter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform the steps of:
   receiving a query related to a strategic game;
   obtaining a description of the strategic game, wherein an actor makes a strategic decision in the strategic game;
   simulating a predetermined number of alternative payoffs to the actor during the strategic game, wherein said simulating comprises: simulating a first portion of the predetermined number of payoffs using a first solution concept and simulating a second portion of the predetermined number of payoffs using a second solution concept;
   utilizing a machine learning prediction tool to predict a payoff to the actor based on the predetermined number of payoffs, wherein the machine learning predicting tool is trained with a plurality of pairs, each pair comprising a set of simulated payoffs and an actual payoff, wherein the simulated payoffs are predetermined number of the alternative payoffs determined in accordance with the corresponding solution concept; and
   providing the payoff prediction to a user in response to the query.

2. The computerized apparatus of claim 1, wherein the first and second solution concepts are selected from the group consisting of: quantal response equilibrium, Nash equilibrium, and quantal level k equilibrium.

3. The computerized apparatus of claim 1, wherein said simulating further comprises simulating additional payoffs, and extracting percentiles from the payoffs and the additional payoffs to extract the predetermined number of payoffs.

4. The computerized apparatus of claim 1, wherein the processor is further adapted to:
   receive from a user a payoff outcome to the actor in the strategic game; and
   train the machine learning prediction tool based on a set of the predetermined number of payoffs and the payoff outcome.

5. The computerized apparatus of claim 1, wherein the processor is further adapted to normalize the predetermined number of payoffs, and wherein the set of simulated payoffs are normalized.

6. The computerized apparatus of claim 1, wherein said obtaining the description of the strategic game comprises:
   obtaining a process tree, wherein the process tree comprises computational nodes and leaf nodes, wherein the computational nodes define a computation value for a variable, wherein the leaf nodes define payoffs for the actors, wherein at least for one leaf node the payoff is defined based on the computational value of the variable; and
   constructing the strategic game based on one or more simulations of the process tree.

7. The computerized apparatus of claim 1, wherein the machine learning prediction tool is trained across multiple games.

8. The computerized apparatus of claim 1, wherein the machine learning prediction tool is trained across multiple games using theoretical predictions of different solution concepts to predict actual solution, whereby overcoming inaccuracies of theoretical predictions.

9. A computerized apparatus having a processor, the processor being adapted to perform the steps of:
   obtaining a process tree representative of a strategic game involving actors, wherein the process tree comprises computational nodes, strategic decision nodes and leaf nodes, wherein the strategic decision nodes are associated with a strategic decision of actors, wherein the computational nodes define a computation value for a variable, wherein the leaf nodes define payoffs for the actors, wherein at least for one leaf node the payoff is defined based on the computational value of the variable;
   simulating routes defined in the process tree to reduce the process tree into a game tree representing the strategic game;
   extracting a feature from the game tree, wherein the feature is based on predictions of payoffs in the strategic game in accordance with a solution concept, wherein the feature comprises a predetermined number of predictions, wherein the number of the predictions is indifferent to the strategic game, wherein said extracting comprises extracting a first feature based on a first solution concept and extracting a second feature based on a second solution concept;
   utilizing a machine learning prediction tool to predict a payoff based on the feature, wherein the machine learning predicting tool is trained with a plurality of pairs, each pair comprising a training feature and an actual payoff, wherein the training feature is based on predictions of the alternative payoffs in strategic games in accordance with the corresponding solution concept, wherein the training feature comprise the predetermined number of predictions, wherein the actual payoffs are actual payoffs that were received in the strategic games; and
   providing the payoff prediction to a user.

10. The computerized apparatus of claim 9, wherein the strategic game is non-deterministic, and wherein said simulating comprises: simulating each route a predetermined number of times and aggregating simulated payoffs to determine for each route an expected payoff.

11. The computerized apparatus of claim 9, wherein said processor is further adapted to perform the steps of:
  obtaining a query regarding expected utility from the strategic game;
  utilizing a machine learning prediction tool to predict the expected utility; and
  outputting a query result based on the prediction of the machine learning prediction tool.

12. The computerized apparatus of claim 11, wherein the query assumes a predetermined actor makes a predetermined action, wherein said simulating simulates that the predetermined actor makes the predetermined action thereby determining the game tree to represent the strategic game under the assumption that the predetermined actor makes the predetermined action.

13. A computer program product comprising a non-transitory computer readable medium retaining program instructions, which instructions when read by a processor, cause the processor to perform a method comprising:
  receiving a query related to a strategic game;
  obtaining a description of the strategic game, wherein an actor makes a strategic decision in the strategic game;
  simulating a predetermined number of payoffs to the actor during the strategic game, wherein said simulating comprises: simulating a first portion of the predetermined number of payoffs using a first solution concept and simulating a second portion of the predetermined number of payoffs using a second solution concept;
  utilizing a machine learning prediction tool to predict a payoff to the actor based on the predicting number of payoffs, wherein the machine learning predicting tool is trained with a plurality of pairs, each pair comprising a set of simulated payoffs and an actual payoff, wherein the simulated payoffs are predetermined number of the alternative payoffs determined in accordance with the corresponding solution concept; and
  providing the payoff prediction to a user in response to the query.

14. The computer program product of claim 13, wherein said obtaining the description of the strategic game comprises:
  obtaining a process tree, wherein the process tree comprises computational nodes and leaf nodes, wherein the computational nodes define a computation value for a variable, wherein the leaf nodes define payoffs for the actors, wherein at least for one leaf node the payoff is defined based on the computational value of the variable; and
  constructing the strategic game based on one or more simulations of the process tree.

* * * * *